(12) United States Patent
Quioc

(10) Patent No.: US 6,997,477 B2
(45) Date of Patent: Feb. 14, 2006

(54) INFLATOR

(75) Inventor: Eduardo L. Quioc, Westland, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 167 days.

(21) Appl. No.: 10/419,544

(22) Filed: Apr. 21, 2003

(65) Prior Publication Data

US 2003/0234526 A1 Dec. 25, 2003

Related U.S. Application Data

(60) Provisional application No. 60/374,095, filed on Apr. 19, 2002.

(51) Int. Cl.
*B60R 21/26* (2006.01)

(52) U.S. Cl. ............... 280/741; 280/736; 280/742

(58) Field of Classification Search ............... 280/741, 280/736, 742
See application file for complete search history.

(56) References Cited

U.S. PATENT DOCUMENTS

| | | | |
|---|---|---|---|
| 4,530,516 A | 7/1985 | Adams et al. | 280/741 |
| 4,944,527 A | 7/1990 | Bishop et al. | 280/741 |
| 4,950,458 A | 8/1990 | Cunningham | 422/164 |
| 5,400,487 A | 3/1995 | Gioutsos et al. | 280/735 |
| 5,547,217 A | 8/1996 | Zelenak et al. | 280/741 |
| 5,558,367 A | 9/1996 | Cuevas | 280/737 |
| 5,564,743 A | 10/1996 | Marchant | 280/741 |
| 5,566,976 A | 10/1996 | Cuevas | 280/737 |
| 5,611,566 A | 3/1997 | Simon et al. | 280/736 |
| 5,613,705 A | 3/1997 | Hock et al. | 280/741 |
| 5,622,380 A | 4/1997 | Khandhadia et al. | 280/736 |
| 5,628,528 A | 5/1997 | DeSautelle et al. | 280/736 |
| 5,658,010 A | 8/1997 | Steffens, Jr. et al. | 280/731 |
| 5,685,558 A | 11/1997 | Cuevas | 280/728.2 |
| 5,753,852 A | 5/1998 | Bernau et al. | 102/530 |
| 5,794,973 A | 8/1998 | O'Loughlin et al. | 280/737 |
| 5,799,973 A | 9/1998 | Bauer et al. | 280/741 |
| 5,851,027 A | 12/1998 | DiGiacomo et al. | 280/736 |
| 5,863,066 A | 1/1999 | Blumenthal | 280/736 |
| 5,934,705 A | 8/1999 | Siddiqui et al. | 280/736 |
| 6,019,389 A | 2/2000 | Burgi et al. | 280/736 |
| 6,032,979 A | 3/2000 | Mossi et al. | 280/741 |
| 6,068,291 A | 5/2000 | Lebaudy et al. | 280/736 |
| 6,095,556 A | 8/2000 | Bailey et al. | 280/737 |
| 6,095,561 A | 8/2000 | Siddiqui et al. | 280/742 |
| 6,139,055 A | 10/2000 | Dahl et al. | 280/741 |
| 6,142,515 A | 11/2000 | Mika | 280/736 |
| 6,149,193 A | 11/2000 | Canterberry et al. | 280/741 |
| 6,168,200 B1 | 1/2001 | Greist, III et al. | 280/736 |
| 6,189,927 B1 | 2/2001 | Mossi et al. | 280/741 |
| 6,199,906 B1 | 3/2001 | Trevillyan et al. | 280/741 |

(Continued)

*Primary Examiner*—Eric Culbreth
(74) *Attorney, Agent, or Firm*—L.C. Begin & Associates PLLC

(57) ABSTRACT

A dual stage inflator 10 utilizes a housing 12 having two laterally oriented propellant chambers 20 and 22. A perforated divider 18 provides lateral separation between chambers 20 and 22, and facilitates fluid communication between chambers 20 and 22 when both chambers are operated. Upon inflator 10 operation, the first chamber 20 is activated operatively independent of the second chamber 22, and if desired, the second chamber 22 may be activated simultaneously or sequentially with chamber 20. A perforated divider 18 provides lateral separation between chambers 20 and 22, and facilitates fluid communication between chambers 20 and 22 when both chambers are activated. The aforementioned design provides simplified manufacturing with equivalent or enhanced structural integrity relative to known inflators.

5 Claims, 1 Drawing Sheet

U.S. PATENT DOCUMENTS

| | | | |
|---|---|---|---|
| 6,315,322 B1 | 11/2001 | Mika | 280/736 |
| 6,364,353 B1 | 4/2002 | Green, Jr. et al. | 280/736 |
| 6,364,354 B1 | 4/2002 | Nakashima et al. | 280/736 |
| 6,406,053 B1 | 6/2002 | Bayer et al. | 280/530 |
| 6,412,815 B1 | 7/2002 | Nakashima et al. | 280/736 |
| 6,422,601 B1 | 7/2002 | Quioc | 280/741 |
| 6,474,684 B1 | 11/2002 | Ludwig et al. | 280/741 |
| 6,659,500 B1 * | 12/2003 | Whang et al. | 280/741 |

* cited by examiner

INFLATOR

CROSS REFERENCE TO RELATED APPLICATIONS

This application claims the benefit of provisional application Ser. No. 60/374,095 filed on Apr. 19, 2002.

FIELD OF THE INVENTION

The present invention relates to gas generators, used to inflate air bags in a vehicle occupant protection system for example, and more particularly, to an improved dual chamber gas generator containing an improved structure for isolating the propellant chambers of a dual chamber inflator so as to ensure proper deployment of the airbag while yet simplifying the manufacture thereof.

BACKGROUND OF THE INVENTION

Inflation systems for deploying an air bag in a motor vehicle generally employ a single gas generator in fluid communication with an uninflated air bag. A firing circuit typically triggers the gas generator when the sensed vehicle acceleration exceeds a predetermined threshold value, as through the use of an acceleration-responsive inertial switch.

However, air bag inflation systems utilizing a single gas generator suffer from the disadvantage that the onset pressurization/inflation rate is generally set to provide aggressive initial inflation in order to achieve a particular inflation time related to occupant position. An aggressive onset rate of pressurization becomes problematic in situations where the occupant is out of position. More specifically, rapid onset pressurization of the air bag may cause the air bag to impact against the occupant with a greater force than necessary. In essence, the airbag volume and inflating capacity are designed to protect both large and small occupants and are generally not variable within the single gas generator. Occasionally, when an air bag utilizing a single gas generator is deployed, smaller occupants, usually children and smaller adults are protected, but sometimes with more force than is necessary. Accordingly, there is a continuous drive to reduce the force acting upon a respective occupant to a tailored force rather than utilizing a generalized force that protects all sizes of occupants.

Commonly owned U.S. Pat. No. 5,400,487 discloses an inflation system that overcomes the above problem by utilizing a plurality of gas generators which are controllably ignited to provide a variable inflation profile which can be tailored to any given occupant weight and/or position and for any crash type. While this arrangement dramatically improves the inflation system's ability to protect an occupant, it does so at significant expense and complexity. The multiple gas generators and squibs add considerable cost to the system, while the firing control circuitry requires sophisticated processors capable of accurately timing the various ignition profiles.

Another proposal, as taught in commonly owned U.S. Pat. No. 5,934,705, is a gas generator having two chambers in a single housing defined by a mechanically retained wall between the ends thereof. Each housing is of a predetermined size that is determinative of the propellant capacity and consequently, of the inflating capability of each chamber. Upon the occurrence of a vehicle collision, depending on the weight of the passenger, either chamber or both may be selectively ignited thereby inflating the protective airbag. However, this design appears to accommodate passenger-side inflators only.

Other known designs employ multiple chamber inflators wherein the chambers are sized to different dimensions and volumes. As such, each chamber retains a relatively greater or lesser amount of gas generant depending on its size. Based on data gathered by an associated system algorithm, the size and/or position of the occupant is then determinative of what chamber or chambers are employed thereby resulting in a greater or lesser airbag restraining force. One concern is that this approach necessarily complicates the manufacturing process in that the inflator contains additional parts. Also, the system algorithm employed to process the occupant size and/or position data is necessarily more complex in that more choices or outcomes are required to accommodate the various permutations or combinations of firing the various chambers.

In general, eliminating certain structural elements and welds while maintaining structural integrity on known inflators presents a dichotomy in that the strength of the pressure vessel may be compromised as welds and/or structural supports are minimized. Nevertheless, eliminating any unnecessary welds and structure reduces the manufacturing requirements and oftentimes the weight of the inflator, thereby saving in manufacturing and raw material costs. As such, there is a continuous drive to simplify the manufacturing of the inflator while retaining the requisite structural integrity.

Therefore, a need exists for a multiple chamber gas generator that exhibits a simplified design, simplified manufacturing, and therefore lower material and manufacturing costs, and yet can still produce selective air bag inflation pressurization.

SUMMARY OF THE INVENTION

Objects of the present invention include reducing manufacturing costs and complexity while retaining structural integrity, and providing various gas output capabilities to meet customer requirements.

In accordance with the present invention, a gas generator comprises a housing having a plurality of apertures spaced therein. A first propellant chamber located within the housing is in fluid communication with the plurality of apertures upon actuation of the gas generator. A second propellant chamber located within the housing is in lateral juxtaposition to and in fluid communication with the first propellant chamber upon actuation of the gas generator. A perforated divider is laterally disposed between the first and second propellant chambers and circumferentially fixed to the housing, thereby providing fluid communication from the second chamber to the first chamber upon actuation of the gas generator. A first gas generant composition contained within the first chamber is ignitable to provide gas upon combustion thereof. A first igniter is fixed within the housing and ignitably communicates with the first chamber for ignition of the first gas generant composition. A second gas generant composition contained within the second chamber is ignitable to provide a gas upon combustion thereof. A second igniter is fixed within the housing and ignitably communicates with the second chamber for ignition of the second gas generant composition. Upon gas generator operation the first chamber is first activated operatively independent of the second chamber, and if desired, the second chamber is activated simultaneously with or after the first chamber thereby producing combustion products that exit the plurality of apertures.

The present design reduces the total number of components as compared to other known inflators thereby correspondingly reducing the total welds and the total manufacturing cost. While cost and complexity are reduced, the inflator chambers remain operably isolated thereby ensuring safety while still providing variable output capability according to customer needs. Further, counterintuitive to what one of ordinary skill might expect, the structural strength of the present inflator is enhanced rather than diminished notwithstanding a relative decrease in the structural supports and welds as compared to known state of the art inflators.

DETAILED DESCRIPTION OF THE PREFERRED EMBODIMENT(S)

Figure 1:
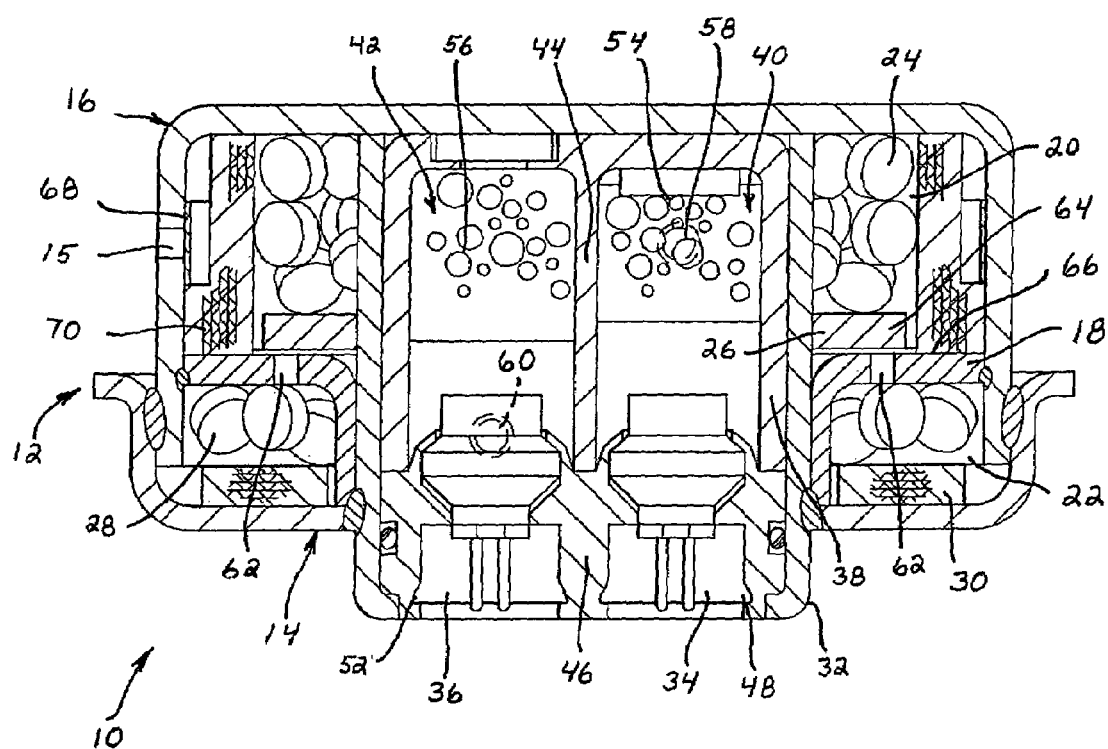
FIG. 1 is a cross-section of a preferred embodiment of the present invention.

In a vehicle occupant protection system, a dual-chamber inflator 10 contains a perforate housing 12 containing a plurality of combustion gas exit orifices 15. A base 14 and a perforated cap 16 are welded or otherwise fixed together in inverted nested relationship, thereby forming the housing 12 containing a plurality of gas exit apertures 15 spaced therein. A perforated divider 18 radially extends between the dish-shaped sections 14 and 16, thereby forming a first propellant chamber 20. A second propellant chamber 22 is juxtaposed in lateral relation to chamber 20. As shown in the Figure, a preferred divider 18 is shaped like an annular bell thereby accommodating a triune weld fixing the base 14, the divider 18, and a booster tube 32 together. A main propellant 24 is contained within the first chamber 20 that when ignited produces a desired amount of gas. A first annular perforate cushion 26 radially extends across the chamber 20 thereby providing a bias against the propellant 24 and inhibiting fracture thereof.

A secondary propellant 28 is contained within chamber 22 and is optionally combusted with primary propellant 24. A second annular perforate cushion 30 radially extends across the chamber 22 thereby exerting a bias on the secondary propellant 28 and inhibiting fracture thereof.

In accordance with the present invention, a booster tube 32 is axially and centrally disposed within housing 12 and houses a first igniter 34 and a second igniter 36. A separator 38 is disposed within the booster tube 32 and functions to form a first igniter chamber 40 and a second igniter chamber 42. As shown in the figure, a separator wall 44 integral to the separator 38 divides the separator 38 into the first annular igniter chamber 40 and the second annular igniter chamber 42.

An igniter housing 46 radially extends across and is crimped or otherwise fixed within the separator 38. A first annular igniter wall 48 is formed within the igniter housing 46 and houses a first igniter 34 fixed therein. A second annular wall 52 is also formed within the igniter housing 46 and houses a second igniter 36 fixed therein. Igniter 34 and 36 extend into ignition chambers 40 and 42, respectively. A first ignition composition 54 is contained within chamber 40. A second ignition composition 56 is contained within chamber 42. At least one gas exit orifice 58 is formed in wall 44 and is laterally oriented with chamber 20.

Primary ignition gases, heat, and/or flame produced upon ignition of composition 54 passes through orifice 58 to ignite the main propellant 24.

At least one secondary gas exit orifice 60 is also formed in wall 44, but is laterally oriented with chamber 22.

Secondary ignition gases, heat, and flame produced upon ignition of composition 56 passes through orifice 60 to ignite the secondary propellant 28, if desired.

At least one third gas exit orifice 62 is formed in the perforated divider 18 to facilitate the flow of gas produced in chamber 22 into chamber 20. A burst shim 64 is fixed across the orifice 62 on a surface 66 opposite the chamber 22. Accordingly, upon activation of the primary chamber 20, chamber 22 remains inactive unless ignited by igniter 52. Other burst shims 68 also cover the orifices 15 that burst upon a design gas pressure.

In operation, depending on signals received from crash sensors (not shown) also integral to the vehicle occupant system, igniter 34 and if desired 36 will ignite ignition compositions 54 and 56, respectively. Next, primary gas generant 24 and if desired, secondary gas generant 28 combust upon exposure to the ignition gases produced from chambers 40 and 42, respectively.

If the secondary chamber 22 is also operated, then gas produced from the chamber 22 will pass through orifice(s) 62 into chamber 20. Primary gases produced in chamber 20 then commingle with secondary gases entering from chamber 22. If desired, an annular filter 70 may be disposed radially outward of booster tube 32 and radially inward of the cap 16. All combustion gases then pass through the filter 70 and exit the housing 12 through gas exit orifices 15.

In accordance with the present invention, a single booster tube 32 housing the two igniters 34 and 36 eliminates the need to provide a booster tube for each igniter. Accordingly, only one tube rather than two need be welded or fixed to the housing 12 during manufacturing. Furthermore, the present design reduces the total number of components as compared to other known inflators thereby reducing the total welds and the total manufacturing cost. While cost and complexity are reduced, the inflator chambers remain operably isolated thereby ensuring safety while still providing variable output capability according to customer needs.

Stated another way, the primary and secondary chambers of the present invention may be independently or simultaneously operated if desired. However, given the reduction in components, the present inflator exhibits a smaller and lightweight design as compared to known driver side inflators while yet providing a simplified design that reduces the manufacturing and inflator costs.

The igniters, the ignition compositions, the gas generant compositions, the housing, and the filter are all provided from well-known suppliers, or alternatively, are provided by well-known manufacturing methods. The annular filter 70, for example, may be provided as expanded wire from Wayne Wire of Michigan. The housing components may, for example be extruded, cast, or stamped.

Exemplary patents include U.S. Pat. Nos. 5,035,757; 5,622,380; 5,628,528; 5,806,888; 6,023,664 and 5,872,329, each incorporated herein by reference.

The ignition housing 46 and the separator 38 are preferably formed as aluminum casts. In accordance with the present invention, the structural design of the ignition housing and the separator facilitates a reduction in the weight of the inflator without compromising the attendant structural strength. Additionally, the main and secondary propellants and the first and secondary ignition compositions may all be the same composition, or if desired, may be different.

It will be understood that the foregoing description of the preferred embodiment of the present invention is for illustrative purposes only. As such, the various structural and operational features herein disclosed are susceptible to a number of modifications, none of which departs from the scope of the present invention as defined in the appended claims.

What is claimed is:

1. A gas generator comprising:
   a housing having a plurality of apertures spaced therein;
   a first propellant chamber located within said housing in fluid communication with said plurality of apertures upon actuation of said gas generator;
   a second propellant chamber located within said housing in vertical juxtaposition to and in fluid communication with said first propellant chamber upon actuation of said second propellant chamber;
   a perforated divider defining an annulus, said divider vertically disposed between said first and second propellant chambers and circumferentially fixed to said housing, thereby providing fluid communication from said second chamber to said first chamber upon actuation of said gas generator;
   a first gas generant composition within said first chamber, said first gas generant ignitable to provide a gas upon combustion thereof;
   an ignition assembly comprising a single booster tube fixed within said housing and said annulus for igniting said gas generants;
   a first igniter fixed within said booster tube and ignitably communicating with said first chamber for ignition of said first gas generant composition;
   a second gas generant composition within said second chamber, said second gas generant ignitable to provide a gas upon combustion thereof; and
   a second igniter fixed within said booster tube and ignitably communicating with said second chamber for ignition of said second gas generant composition,
   wherein upon gas generator operation the first chamber is first activated operatively independent of the second chamber, and if desired, the second chamber is activated simultaneously with or after the first chamber thereby producing combustion products that exit said plurality of apertures.

2. The gas generator of claim 1 wherein said first and second gas generant compositions are substantially equivalent in composition.

3. A gas generator comprising:
   a housing having a plurality of apertures spaced therein;
   a first propellant chamber located within said housing in fluid communication with said plurality of apertures upon actuation of said gas generator;
   a second propellant chamber located within said housing in vertical juxtaposition to and in fluid communication with said first propellant chamber upon actuation of said second propellant chamber;
   an annular perforated divider vertically disposed between said first and second propellant chambers and circumferentially fixed to said housing, thereby providing fluid communication from said second chamber to said first chamber upon actuation of said gas generator;
   a tubular igniter assembly fixed within said housing and radially central of said annular perforated divider, said tubular igniter assembly separated to form a first igniter chamber and a second igniter chamber, said first and second igniter chambers operatively independent of the other;
   a first gas generant composition within said first chamber, said first gas generant ignitable to provide a gas upon combustion thereof;
   a first igniter fixed within said first igniter chamber and ignitably communicating with said first propellant chamber for ignition of said first gas generant composition;
   a second gas generant composition within said second propellant chamber, said second gas generant ignitable to provide a gas upon combustion thereof; and
   a second igniter fixed within said second igniter chamber and ignitably communicating with said second chamber for ignition of said second gas generant composition,
   wherein upon gas generator operation the first propellant chamber is initially activated operatively independently of the second propellant chamber whereby gases produced from said first gas generant composition exit through said plurality of apertures.

4. The gas generator of claim 3 wherein the second propellant chamber is activated simultaneously with or after the first propellant chamber thereby producing combustion products that exit said plurality of apertures.

5. A gas generator comprising:
   a housing having a plurality of apertures spaced therein;
   a first propellant chamber located within said housing in fluid communication with said plurality of apertures upon actuation of said gas generator;
   a second propellant chamber located within said housing in vertical juxtaposition to and in fluid communication with said first propellant chamber upon actuation of said gas generator;
   a perforated divider vertically disposed between said first and second propellant chambers and circumferentially fixed to said housing, thereby providing fluid communication from said second chamber to said first chamber upon actuation of said second chamber and said gas generator;
   a first gas generant composition within said first chamber, said first gas generant ignitable to provide a gas upon combustion thereof;
   a first igniter fixed within said housing and ignitably communicating with said first chamber for ignition of said first gas generant composition;
   a second gas generant composition within said second chamber, said second gas generant equivalent in composition to said first gas generant composition and ignitable to provide a gas upon combustion thereof; and
   a second igniter fixed within said housing and ignitably communicating with said second chamber for ignition of said second gas generant composition,
   wherein upon gas generator operation the first chamber is first activated operatively independent of the second chamber, and if desired, the second chamber is activated simultaneously with or after the first chamber thereby producing combustion products that exit said plurality of apertures.

* * * * *